US 6,541,120 B1

(12) United States Patent
Klein et al.

(10) Patent No.: US 6,541,120 B1
(45) Date of Patent: Apr. 1, 2003

(54) CATHODIC ELECTRODEPOSITION COATINGS, THEIR PRODUCTION AND THEIR USE

(75) Inventors: Klausjörg Klein, Wuppertal (DE); Walter Kohhirt, Remscheid (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/914,223

(22) PCT Filed: Feb. 22, 2000

(86) PCT No.: PCT/EP00/01434

§ 371 (c)(1),
(2), (4) Date: Aug. 22, 2001

(87) PCT Pub. No.: WO00/50522

PCT Pub. Date: Aug. 31, 2000

(30) Foreign Application Priority Data

Feb. 25, 1999 (DE) .......................................... 199 08 144

(51) Int. Cl.[7] .............................................. B32B 15/08
(52) U.S. Cl. ....................... 428/457; 428/413; 428/458; 428/460; 428/461; 525/16; 204/499

(58) Field of Search ................................. 428/457, 458, 428/460, 461, 413; 525/16; 204/499

(56) References Cited

U.S. PATENT DOCUMENTS

| 4,286,073 A | | 8/1981 | Coe | |
|---|---|---|---|---|
| 5,718,817 A | * | 2/1998 | Bossert et al. | ............... 204/501 |
| 6,284,309 B1 | * | 9/2001 | Bishop et al. | ................. 427/98 |

FOREIGN PATENT DOCUMENTS

| WO | WO 9504093 A | 2/1995 |
|---|---|---|

* cited by examiner

Primary Examiner—Robert Dawson
Assistant Examiner—Christopher Keehan

(57) ABSTRACT

Aqueous, lead-free cathodically depositable (CDL) coating compositions containing binders and, optionally, crosslinking agents, pigments, and/or additives conventionally employed in lacquers, as well as one or more sulfonic acid salts of the metals vanadium, manganese, iron, zinc, zirconium, silver, tin, lanthanum, cerium and/or bismuth and/or of organometallic compounds in a total amount of from 0.2 to 2 wt. %, calculated as metal and based on the resin solids.

10 Claims, No Drawings

CATHODIC ELECTRODEPOSITION COATINGS, THEIR PRODUCTION AND THEIR USE

The invention relates to cathodically depositable dipping lacquers (CDL), their production and their use in methods of coating electrically conductive substrates by cathodic dip-coating.

A wide variety of CDL coating compositions are known. The patent literature discloses many examples of ecologically advantageous, lead-free CDL coating compositions containing many different metal compounds, especially tin and/or bismuth compounds, as crosslinking catalysts. For example, there are known from WO 93/24578 CDL coating compositions that contain bismuth salts of aliphatic hydroxycarboxylic acids as catalysts. WO 98/10024 describes CDL coating compositions containing catalytically active mixtures of bismuth and aminocarboxylic acids. EP-A-0 509 437 describes CDL coating compositions that contain dialkyltin dicarboxylates derived from aromatic carboxylic acids as crosslinking catalysts, as well as bismuth or zirconium compounds as further catalysts.

CDL baths are pumped round continuously and are subjected to shear stress. An important criterion for the quality of CDL coating compositions is their shear stability. Shear instability manifests itself in the case of CDL coating compositions as sedimentation. Such sedimentation leads in practice to the inclusion of dirt in the CDL layer, especially during the process of applying CDL coatings to substrate surfaces in the horizontal position. Such sedimentation phenomena can be quantified in the laboratory by determining the sieving residue of CDL baths.

The object of the invention is to provide lead-free cathodically depositable coating compositions having good shear stability.

It has been found that this object can be achieved with aqueous lead-free CDL coating compositions containing binders and, optionally, crosslinking agents, pigments, and/or additives conventionally employed in lacquers, which coating compositions are characterised in that they contain sulfonic acid salts of vanadium, manganese, iron, zinc, zirconium, silver, tin, lanthanum, cerium and/or bismuth and/or sulfonic acid salts of organometallic compounds, preferably of tin, in a total amount of from 0.2 to 2 wt. %, calculated as metal and based on the resin solids (based on binders, any crosslinking agents present and any other resins contained in the CDL coating composition, such as, for example, paste resins).

The lead-free CDL coating compositions according to the invention are aqueous electro-dipping lacquers known per se which can be deposited at the cathode, to which there are added sulfonic acid salts of vanadium, manganese, iron, zinc, zirconium, silver, tin, lanthanum, cerium and/or bismuth and/or organometallic sulfonic acid salts, preferably of tin, for example, as crosslinking catalysts replacing lead catalysts.

The CDL coating compositions according to the invention are aqueous coating compositions having a solids content of, for example, from 10 to 30 wt. %. The solids content consists of the resin solids, of the content of sulfonic acid salts or organometallic sulfonic acid salts that is essential to the invention, any pigments and/or fillers and further additives that may be present. The resin solids consists of conventional CDL binders, which carry cationic substituents or substituents that can be converted into cationic groups as well as groups capable of chemical crosslinking, and any CDL paste resins and crosslinking agents that may be present. The cationic groups may be cationic groups or basic groups that can be converted into cationic groups, for example, amino, ammonium, e.g., quarternary ammonium, phosphonium and/or sulfonium groups. Binders having basic groups are preferred. Basic groups containing nitrogen, such as amino groups, are particularly preferred. Such groups may be present in quaternary form or they are converted into cationic groups in the manner known to the person skilled in the art using a conventional neutralising agent, especially an inorganic or organic acid, such as, for example, a sulfonic acid such as amidosulfonic acid (sulfamic acid) or methanesulfonic acid, lactic acid, formic acid, acetic acid. The degree of neutralisation is, for example, from 20 to 80%.

In addition to the sulfonic acid salts present according to the invention, the CDL coating compositions may contain additives conventionally employed in lacquers, for example conventionally employed in CDL coating compositions, Examples thereof are wetting agents, anticratering agents, flow agents, antifoams, as well as organic solvents customarily used for CDL coating compositions. Examples of such solvents are alcohols, such as, for example, cyclohexanol, 2-ethylhexanol; glycol ethers, such as, for example, methoxypropanol, ethoxypropanol, butoxyethanol, diethylene glycol diethyl ether; ketones, such as for example, methyl isobutyl ketone, methyl ethyl ketone, cyclohexanone; hydrocarbons.

The cationic or basic binders may be, for example, resins which contain primary, secondary and/or tertiary amino groups and the amine numbers of which are, for example, from 20 to 250 mg KOH/g. The weight-average molar mass (Mw) of the CDL resins is preferably from 300 to 10,000. The resins that may be used according to the invention are subject to no limitation. It is possible to use the many different self-crosslinking CDL binders and CDL binder/crosslinking agent combinations that crosslink by external means known from the extensive patent literature. Examples of such CDL resins are amino (meth)acrylate resins, aminoepoxy resins, aminoepoxy resins having terminal double bonds, aminoepoxy resins having primary OH groups, aminopolyurethane resins, amino-group-containing polybutadiene resins or modified epoxy resin-carbon dioxide-amine reaction products. Such binders may be self-crosslinking, or they are used in admixture with known crosslinking agents familiar to the person skilled in the art. Examples of such crosslinking agents are aminoplastic resins, blocked polyisocyanates, crosslinking agents having terminal double bonds, polyepoxy compounds, crosslinking agents having cyclic carbonate groups, or crosslinking agents that contain groups capable of transesterification and/or transamidation.

In addition to the CDL binders and any crosslinking agent that may be present, and the content of sulfonic acid salts that is essential to the invention, the CDL coating compositions according to the invention may contain pigments, fillers, and/or additives conventionally employed in lacquers. Suitable pigments and/or fillers are the conventional inorganic and/or organic pigments. Examples are carbon black, titanium dioxide, iron oxide, kaolin, talcum or silicon dioxide, phthalocyanine pigments and quinacridone pigments, as well as anticorrosive pigments, such as zinc phosphate. The nature and amount of the pigments are dependent on the intended use of the CDL coating compositions. If clear coatings are to be obtained, then no pigments or only transparent pigments, such as, for example, micronised titanium dioxide or silicon dioxide, are used. If opacifying coatings are to be applied, then the CDL bath preferably contains colour-giving pigments.

The CDL coating compositions according to the invention contain sulfonic acid salts of vanadium, manganese, iron, zinc, zirconium, silver, tin lanthanum, cerium and/or bismuth and/or organometallic sulfonic acid salts, preferably of the above metals and particularly preferably of tin. Sulfonic acid salts of bismuth and organotin sulfonic acid salts are preferred. The sulfonic acid salts and organometallic sulfonic acid salts, together also referred to hereinbelow as "sulfonic acid salts" for short, are salts derived from one or more mono- or poly-basic, preferably water-soluble sulfonic acids. Examples of sulfonic acid from which the sulfonic acid salts contained in the CDL coating compositions according to the invention may be derived are amidosulfonic acid and/or organic sulfonic acids, such as N-alkylamidosulfonic acids, for example N-$C_1$–$C_4$-alkylamidosulfonic acids; alkanesulfonic acids, which may be substituted in the alkyl radical, such as methanesulfonic acid, ethanesulfonic acid, propanesulfonic acid, trifluoromethanesulfonic acid, hydroxyethanesulfonic acid, hydroxypropanesulfonic acid; arylsulfonic acids, which may be substituted in the aryl radical, such as benzenesulfonic acid, benzenedisulfonic acids, p-toluenesulfonic acid, 1- or 2-naphthalenesulfonic acid, dodecylbenzenesulfonic acid. Preference is given to the salts of monobasic sulfonic acids. Special preference is given to the salts of monobasic alkanesulfonic acids, especially salts of methanesulfonic acid.

The proportion of sulfonic acid salts in the CDL coating composition according to the invention is from 0.2 to 2 wt. %, preferably from 0.5 to 1.5 wt. %, calculated as metal and based on the resin solids in the CDL coating composition. The sulfonic acid salts or organometallic sulfonic acid salts may be present in the CDL coating compositions according to the invention dissolved or finely distributed in the aqueous or in the disperse phase.

The metallic sulfonic acid salts or organometallic sulfonic acid salts can be prepared by reacting the sulfonic acids with suitable metal compounds, for example metallic oxides, hydroxides or carbonates, such as, for example, preferably bismuth oxide, or with suitable organometallic compounds, for example hydrocarbyl metallic oxides, such as, for example, preferably dialkyltin oxides, such as, for example, dibutyltin oxide or dioctyltin oxide. It is possible to react one or more metallic compounds in a mixture and/or one or more organometallic compounds in a mixture with one or more sulfonic acids. The salt formation may be carried out, for example, in the presence of water, optionally in admixture with organic solvents.

Salt formation by reaction of the metallic or organometallic compounds with the sulfonic acids can be carried out stoichiometrically or with a deficient amount or with an excess of sulfonic acid. This is explained, in the case of metallic sulfonic acid salts, using the example of bismuth sulfonic acid salts, which are preferred, which can be formed, for example, by reaction of bismuth oxide ($Bi_2O_3$) with a monobasic sulfonic acid in a molar ratio of 1:2 to, for example, 8, preferably 1:3 to 7, a molar ratio of bismuth oxide to monobasic sulfonic acid of 1:6 corresponding to a stoichiometric reaction. The same applies to organometallic sulfonic acid salts, and this is explained using the example of dialkyltin sulfonic acid salts, which are preferred, which can be formed, for example, by reaction of dibutyltin oxide ($Bu_2SnO$) with a monobasic sulfonic acid in a molar ratio of 1:0.5 to, for example, 3, preferably 1:1 to 2.5, a molar ratio of dibutyltin oxide to monobasic sulfonic acid of 1:2 corresponding to a stoichiometric reaction. After the reaction, excess sulfonic acid can be separated from the sulfonic acid salt that has formed or can be introduced therewith into the CDL coating composition according to the invention and serve as the sole neutralising agent or as part of the acids altogether contained therein as neutralising agent. The sulfonic acid salts can be isolated as such and used in the production of the CDL coating compositions according to the invention, or they are used, without being isolated and purified, in admixture with further constituents of the reaction medium from the preparation of the sulfonic acid salts, for example in the form of an aqueous solution.

The sulfonic acid salts can be incorporated into the CDL coating compositions in various ways. For example, the sulfonic acid salts may be added to an optionally already neutralised CDL binder solution before addition of substantial amounts of water as diluent, and then be homogenised with stirring. Alternatively, when the corresponding sulfonic acids are used as neutralising agent for the binders, it is also possible, for example, to work with the metallic oxide, hydroxide or organometallic oxide, the corresponding sulfonic acid salts being formed in situ; in that case there is advantageously used an increased amount of sulfonic acid adapted according to the amount of sulfonic acid required for neutralisation of the CDL binders, in general corresponding to a degree of neutralisation of over 100%. It is preferred to add the sulfonic acid salts to the finished aqueous CDL binder dispersion or to the finished CDL coating composition per se, for example in the form of a sulfonic acid salt solution, e.g., in the form of an aqueous sulfonic acid salt solution. Addition in the form of a sulfonic acid salt solution may also take place at an earlier stage in the production of the CDL coating compositions according to the invention.

Regardless of whether the CDL coating compositions according to the invention are pigmented or transparent, they can be produced, for example, entirely by the so-called single-component process. In the case of pigmented CDL coating compositions, single-component concentrates are prepared by distributing, for example dispersing, and optionally milling pigments and fillers in the organic solution of a CDL binder, for example of a paste resin suitable for CDL coating compositions, adding further organically dissolved CDL binder, neutralising with acid and, generally, diluting with water. The concentrates may be low in water or water-free and generally neutralised. They are mixed with water in the case of the preparation of a fresh CDL bath or, in the case of solids compensation, with the contents of a CDL bath depleted of solids by CDL deposition. The addition of sulfonic acid salt essential to the invention may be carried out according to all the addition methods described above.

Regardless of whether the CDL coating compositions according to the invention are pigmented or transparent, they may also be prepared, for example, by the so-called two-component process. In that case, the addition of sulfonic acid salt essential to the invention may be carried out as described below.

The two-component CDL materials which can be used for producing the, CDL coating compositions according to the invention are a) a binder component in the form of a solvent-free or low-solvent, aqueous dispersion containing CDL binder and, optionally, crosslinking agents (CDL dispersion) and b) a separate pigment paste and/or catalyst paste. In the case of CDL coating compositions pigmented with opacifying pigments, a pigment paste b) containing opacifying pigments is used. In the case of transparent CDL coating compositions, a pigment paste b) containing transparent pigments can be used. Component a) and/or component b) many contain sulfonic acid salt.

The two-component CDL materials are preferably a) a binder component in the form of a solvent-free or low-solvent, aqueous dispersion containing CDL binder and, optionally, crosslinking agent (CDL dispersion) and b1) a separate pigment paste and/or b2) a separate catalyst paste containing sulfonic acid salt or b3) a separate catalyst preparation containing sulfonic acid salt. In the case of CDL coating compositions pigmented with opacifying pigments, a pigment paste b1) containing opacifying pigments is used. In the case of transparent CDL coating compositions, a pigment paste b1) containing transparent pigments can be used. If a pigment paste b1) is used, it may contain the sulfonic acid salt catalyst, in which case a catalyst paste b2) or catalyst preparation b3) is not necessary. If the pigment paste b1) does not contain sulfonic acid salt catalyst, or if the CDL coating compositions are prepared without the use of a pigment paste b1), then a catalyst paste b2) or, preferably, a catalyst preparation b3) is used.

Dilution of components a) and b) or a) and b1) and/or b2) or b3) with water or with the contents of a CDL bath depleted of solids by CDL deposition is preferably carried out separately, for example by separate but parallel addition to the water (preparation of a fresh CDL bath) or of CDL bath depleted of solids (solids compensation).

The pigment pastes b1) may contain the sulfonic acid salts or may be free thereof. Pigment pastes b1) can be prepared by dispersing the pigments and fillers and, optionally, the sulfonic acid salts in CDL binders, preferably in CDL paste resins. Such resins are known to the person skilled in the art. Examples of paste resins that can be used in CDL baths are described in EP-A-0 183 025 and in EP-A-0 469 497.

Catalyst pastes b2) can be prepared, for example, by pre-mixing, for example pre-dispersing, suitable metallic or organometallic compounds with sulfonic acid in the presence of organic solvents and/or water, and subsequently dispersing and optionally milling the resulting mixture with CDL binder, preferably with CDL paste resin and water.

The catalyst preparation b3) may be a finely divided suspension, for example a colloidal or molecular solution; in the simplest case it is an aqueous solution of the metallic sulfonic acid salt or organometallic sulfonic acid salt.

From the CDL coating compositions according to the invention, CDL coating layers can be cathodically deposited in the conventional manner on plastics substrates that are electrically conductive, for example that are electrically conductive or have been rendered electrically conductive, for example that have been rendered electrically conductive by metallisation, or, especially, on metal substrates. Accordingly, the invention also provides a method of cathodically depositing CDL coating compositions according to the invention on such substrates.

There may be used as metal substrates parts made of all conventional metals, for example the metal parts conventionally employed in the automotive industry, especially automotive bodies and parts thereof. Examples are components of aluminium, magnesium or alloys thereof, and especially steel, for example ungalvanised or galvanised with pure zinc, zinc-nickel alloy or zinc-iron alloy. The metal substrates may be phosphated and passivated in the conventional manner. The corrosion protection of primer coats deposited from the CDL coating compositions according to the invention on, for example, steel is also outstanding on bright steel or on steel that has only been phosphated but not passivated. The various substrates may be present jointly on a workpiece (mixed construction). It is also possible for metal parts or plastics parts that have already been partially or completely pre-coated to be present on the workpiece, which parts pass through the method according to the invention, for example, unchanged, that is to say no CDL coating layer in particular is deposited on their surface in the course of the method according to the invention.

After coating with the CDL coating composition according to the invention, the coating is crosslinked by stoving, for example, in directly and/or indirectly fired stoving ovens, for example at object temperatures of from 130 to 200° C. If the coating is, for example, a CDL primer coat, then further subsequent layers may be applied.

The CDL baths according to the invention are lead-free and exhibit no or only extremely slight sedimentation phenomena even when subjected to shear.

EXAMPLE 1

Preparation of Bismuth Hydroxycarboxylic Acid Salts

Deionised water and hydroxycarboxylic acid are placed in a vessel and heated to 70° C. Commercially available bismuth oxide ($Bi_2O_3$) is added in portions, with stirring. After a further 6 hours' stirring at 70° C., the batch is cooled to approximately 20° C. and left for 12 hours without stirring. Finally, the precipitate is filtered off, washed with a small amount of water and ethanol and dried at a temperature of from 40 to 60° C.

The following salts are prepared using the amounts indicated:

Bismuth Lactate:
466 parts (1 mol.) of bismuth oxide+901 parts (7 mol.) of lactic acid 70% in water Bismuth Dimethylolpropionate:
466 parts (1 mol.) of bismuth oxide+938 parts (7 mol.) of dimethylolpropionic acid+2154 parts of water

EXAMPLE 2

Preparation of Bismuth Methanesulfonate

A mixture of 296 g of deionised water and 576 g (6 mol.) of methanesulfonic acid is placed in a vessel and heated to 80° C. 466 g (1 mol.) of commercially available bismuth oxide ($Bi_2O_3$) are added in portions, with stirring. After 3 hours, a cloudy liquid forms which, when diluted with 5400 g of deionised water, yields an opalescent solution. After concentration of the solution by evaporation, bismuth methanesulfonate remains.

EXAMPLE 3

Preparation of CDL Dispersions a) 832 parts of the monocarbonate of an epoxy resin based on bisphenol A (commercial product Epikote 828) are mixed with 830 parts of a commercially available polycaprolactone polyol (commercial product CAPA 205) and 712 parts of diglycol dimethyl ether and reacted at from 70 to 140° C. with approximately 0.3% $BF_3$ etherate until an epoxy number of 0 is reached. To that product there are added at from 40 to 80° C., in the presence of 0.31% Zn acetylacetonate as catalyst, 307 parts of a reaction product of 174 parts of toluyne diisocyanate and 137 parts of 2-ethylhexanol with addition of 0.3% benzyltrimethylammonium hydroxide. The reaction is carried out until the NCO value is approximately 0, and the mixture is then adjusted to a solids content of 70 wt. % with diglycol dimethyl ether.

b) To 1759 parts of a bicarbonate of an epoxy resin based on bisphenol A (commercial product Epikote 1001) there are slowly added at from 60 to 80° C. 618 parts of a reaction product of 348 parts of toluene diisocyanate and 274 parts of 2-ethylhexanol with addition of 0.3% benzyltrimethylammonium hydroxide. The reaction is continued to an NCO value of approximately 0.

c) To 860 parts of bishexamethylenetriamine dissolved in 2315 parts of methoxypropanol there are added at a temperature of from 20 to 40° C. 622 parts of the reaction product of 137 parts of 2-ethylhexanol with 174 parts of toluene diisocyanate with benzyltrimethylammonium hydroxide catalysis (0.3%), and the reaction is carried out to an NCO content of approximately 0. Then 4737 parts of the reaction product b) and 3246 parts of the reaction product a) (each 70% in diglycol dimethyl ether) are added and the mixture is reacted at from 60 to 90° C. The reaction is terminated at an amine number of approximately 32 mg KOH/g. The resulting product is distilled off in vacuo to a solids content of approximately 85%.

d1) Neutralisation is carried out with 30 mmol. of formic acid/100 g of resin. The mixture is then heated to 70° C. and, in the course of two hours, bismuth lactate (from Example 1) is added in portions, with stirring, in such an amount that 1.5 wt. % of bismuth, based on the solids content, are present in the batch. Stirring is then carried out for a further 6 hours at from 60 to 70° C. After cooling, the batch is converted with deionised water into a dispersion having a solids content of 40 wt. %.

d2) The procedure described in d1) is followed, but bismuth methanesulfonate (from Example 2) is used instead of bismuth lactate.

EXAMPLE 4

Preparation of a Pigment Paste 15 parts of acetic acid (50%), 30 parts of a commercially available wetting agent (50%) and 374 parts of deionised water are added, under a high-speed stirrer, to 223 parts of the paste resin according to EP-A-0 469 497 A1 Example 1 (55%).

5 parts of carbon black, 5 parts of pyrogenic silica and 560 parts of titanium dioxide are added thereto. The mixture is adjusted to a solids content of approximately 50% with deionised water and milled in a bead mill. A stable pigment paste is formed.

EXAMPLE 5

Preparation of a Bismuth-containing CDL Bath, Comparison 4.5 parts of formic acid (50%) and 1760 parts of deionised water are added to 815.5 parts of the dispersion of Example 3 d1). 420 parts of pigment paste according to Example 4 are added with thorough stirring. The resulting CDL bath is poured through a sieve of mesh size 30 $\mu$m which has previously been weighed. After drying of the sieve, the sieving residue of the CDL bath is determined by re-weighing. It is less than 10 mg/l CDL bath. The CDL bath is subjected to shear by being stirred for 48 hours, while covered, using a magnetic stirrer (Teflon-coated magnetic stirring rod). The sieving residue of the CDL bath is then determined again: 83 mg/l CDL bath.

EXAMPLE 6

Preparation of a Bismuth-containing CDL Bath, According to the Invention 4.5 parts of formic acid (50%) and 1760 parts of deionised water are added to 815.5 parts of the dispersion of Example 3 d2). 420 parts of pigment paste according to Example 4 are added, with thorough stirring. The sieving residue before and after exposure to shear is determined in a manner analogous to that of Example 5. It is less than 10 mg/l CDL bath both before and after exposure to shear.

What is claimed is:

1. Aqueous, lead-free, cathodically depositable coating compositions comprising binders of resin solids and, optionally, crosslinking agents, pigments, and conventional additives and wherein the coating compositions comprise at least one alkanesulfonic acid salt selected from the group consisting of bismuth alkanesulfonic acid salts, organobismuth alkanesulfonic acid salts and any mixture thereof in a total amount from 0.2 to 2 wt. %, calculated as bismuth metal and based on the resin solids.

2. The aqueous coating compositions according to claim 1 in which the alkanesulfonic acid salts comprise a substituted alkyl radical.

3. The aqueous coating compositions according to claim 1 wherein the alkanesulfonic acid salts consist of methanesulfonic acid salts.

4. Process for the production of an aqueous coating composition according to claim 1 which comprises incorporating the sulfonic acid salts into an aqueous dispersion of the binder of the coating composition and processing the resulting dispersion of binder and sulfonic acid salts to form the aqueous coating composition.

5. Process according to claim 4 wherein the sulfonic acid salts are incorporated in the form of a pigment paste containing pigments and binder and compounds selected from the group consisting of fillers, paste resin and any mixtures thereof.

6. Process according to claim 4 wherein the sulfonic acid salts are incorporated in the form of a catalyst paste comprising binder or paste resin.

7. Process according to claim 4 wherein the sulfonic acid salts are incorporated in the form of a catalyst preparation consisting of a suspension or solution.

8. Method of cathodic dipcoating a substrate having a conductive surface by connecting the substrate as a cathode in an electrocoating bath containing the coating composition of claim 1 and cathodically depositing a coating of the composition of claim 1 on the substrate and removing the substrate from the bath.

9. The method according to claim 8 wherein the substrate is a motor vehicle body or a motor vehicle part.

10. A Substrate having a coating of the composition of claim 1.

* * * * *

UNITED STATES PATENT AND TRADEMARK OFFICE
CERTIFICATE OF CORRECTION

PATENT NO. : 6,541,120 B1
DATED : April 1, 2003
INVENTOR(S) : Klausjorg Klein and Walter Kohhirt It is certified that error appears in the above-identified patent and that said Letters Patent is hereby corrected as shown below:

<u>Column 4,</u>
Line 64, the word "many" should read -- may --.

Signed and Sealed this

Fifteenth Day of July, 2003

JAMES E. ROGAN
*Director of the United States Patent and Trademark Office*